Figure 1:
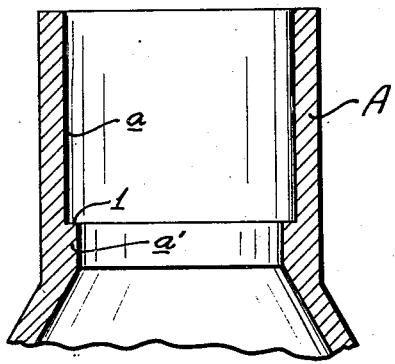

Sept. 9, 1941.  P. H. THOMPSON  2,255,301

METHOD OF MAKING PIPE-JOINT FITTINGS

Filed May 8, 1939

INVENTOR

PARKE H. THOMPSON

BY

ATTORNEY

Patented Sept. 9, 1941

2,255,301

UNITED STATES PATENT OFFICE 2,255,301

METHOD OF MAKING PIPE-JOINT FITTINGS

Parke H. Thompson, Millville, N. J., assignor of thirty-five per cent to Russell Maguire, New York, N. Y.

Application May 8, 1939, Serial No. 272,376

7 Claims. (Cl. 29—148.2)

This invention relates to a certain new and useful improvement in pipe-joint fittings and to the methods of making the same.

It is accepted or common practice today, particularly in the installation of refrigerating systems, to employ welded or soldered pipe joints. This practice has resulted primarily from the introduction of highly efficient, but nevertheless extremely expensive, refrigerants, which are unusually mobile in character and difficult to retain in a system with ordinary types of threaded, gasketed, or packed joints.

The rapidly spreading use of refrigeration and air-conditioning equipment in homes and public buildings has created a considerable problem in connection with pipe-joint technique. Many refrigerants in common use are noxious and even toxic. As a matter of fact, it has recently been discovered that the supposedly inert refrigerant "Freon" may undergo chemical changes in the presence of an open flame and water vapor, forming deadly phosgene gas. These conditions and circumstances have led to the adoption in many cities of local refrigeration codes and ordinances requiring the pipe-joints in refrigeration systems to be of the hard soldered variety, so as to give effective resistance to leakage in case of fire by increasing the melting point of the joint solder.

Present day fittings adapted for use in installations of the type mentioned are, so far as I am aware, constructed of forged brass or drawn copper, so designed that soft solders may be flowed into a thin annular space between the pipe wall and the inner face of the fitting. Such joints, however, are comparatively weak in structural strength and must, therefore, be elongated.

In addition, forged brass and drawn copper fittings are in themselves extremely expensive and of relatively poor wearing qualities.

Finally, it is exceedingly difficult to fit a pipe into a brass or copper fitting by hard soldering methods, for the high temperatures required structurally weaken the fitting and distill off the zinc from the brass, making it difficult indeed to properly flux the joint and secure a pressure-tight seal.

My invention hence has for its primary objects the provision of a pipe-joint fitting which is exceptionally economical in cost of construction and installation, which is strong, rugged, and durable, which will retain its full structural strength under the elevated temperature conditions normally employed in hard soldering operations, which provides an extremely satisfactory leak-resistant joint, and which is highly efficient in the performance of its intended functions.

And with the above and other objects in view, my invention resides in the novel features of form, construction, arrangement, and combination of parts of the fitting and in the unique methods of its production presently described and pointed out in the claims.

Figure 3:
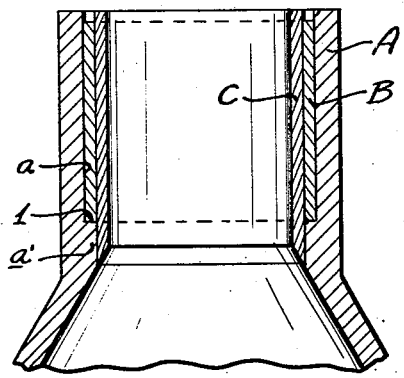
Figure 4:
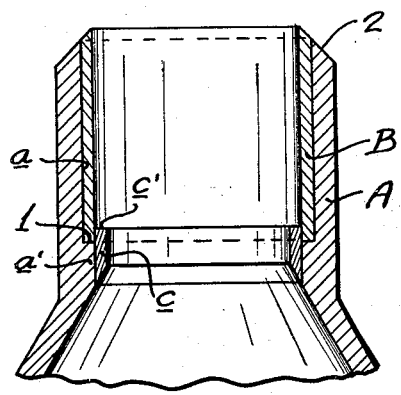
Figure 5:
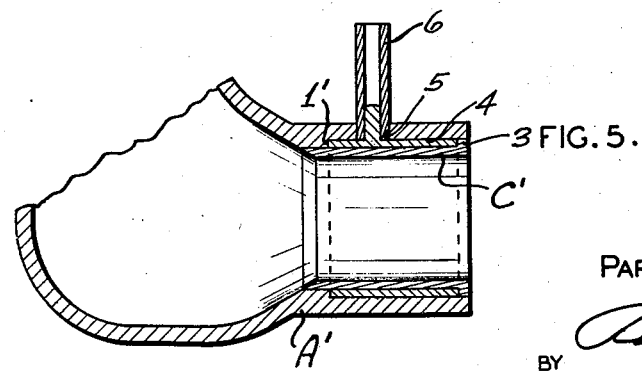

In the accompanying drawing,

Figures 1, 2, 3, and 4 are fragmental longitudinal sectional views of a pipe or tube section, progressively illustrating the successive steps in the construction of a pipe or tube joint fitting according to and embodying my present invention; and Figure 5 is a fragmentary sectional view of a modified pipe or tube joint fitting in course of construction in accordance with, and also embodying, my invention.

Referring now in more detail and by reference characters to the drawing, A is a tubular joint-forming section fabricated of forged, drawn, or cast steel or other suitable material and is usually or preferably a unitary portion of a valve-flange, valve-body, fitting or piece of equipment to which a pipe is to be joined or connected.

The tubular section A is roughly machined to the proper sizing of the particular joint-bore and, as at $a$, counterbored for substantially its entire length in the provision of a shoulder $l$, as shown in Figure 1.

Figure 2:
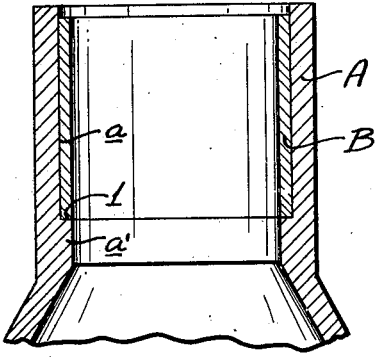

First then loosely disposed within the tubular section A in endwise abutment against the shoulder $l$, is a tubular section or so-called thimble B of coiled copper wire, copper sheet, drawn copper sheet, pressed copper, or suitably consolidated copper filings, the thimble B having an external diametral size substantially equivalent to the internal diametral size of the counterbored portion $a$ of the fitting A and an internal diametral size substantially equivalent to the normal internal diametral size of the portion $a'$ of the tubular section A, so that the sleeve B and the portion $a'$ of the section A are substantially flush at and longitudinally along their inner peripheral face, all as best seen in Figure 2.

An inner liner C of steel or of some suitable high melting point metal or non-metallic refractory material having an outer diametral size substantially the same as the diametral size of the portion $a'$ of the section A is then inserted within the section A and engaged along its outer peripheral face with the respective inner peripheral faces of the copper thimble B and of the portion $a'$ of the main outer section A, substantially as shown in Figure 3. Thus the copper thimble B is housed, as it may be said, intermediate the main outer section A and the inner liner C.

The described assembly comprising the section A, thimble B, and liner C is now placed in a reducing atmosphere within a controlled atmosphere furnace and brought to the temperature required to melt or use the copper thimble B, which, as will be understood, has a melting point considerably lower than that of both the main outer section A and the inner liner C. The thimble B is thereby fused within and joined or united to the section A under conditions substantially similar to those prevailing in copper brazing, the thimble B being melted and brazed firmly to the inner surface of the section A.

Upon removal in due course from the furnace, the section A and its associated members are allowed to cool, and the steel inner liner C then drilled out or its removal otherwise effected for substantially its entire length, a relatively small annular portion c thereof being, however, permitted to remain within the fitting A in overlying disposition upon the inner peripheral face of its portion a' and thereby providing an abutment or shoulder, as at c', as shown in Figure 4, against which an inserted pipe-member may be endwise impinged in completing the particular joint.

As described, the thimble B is substantially fused or alloyed with the section A along the interfaces therebetween, and thus the section A is economically and with facility united to, and provided substantially integrally with, a long tubular copper section forming a surface against which a hard soldered joint may be formed with an inserted pipe-member, and for convenience in finishing the final soldered joint, the section A upon its outer end may be beveled or chamfered, as at 2, to permit the copper lining to extend slightly therebeyond.

I may add that, if required, the inner liner C may be sealed to the outer section A by means of resistance welding to prevent the fluid copper, developing on melting of thimble B, from leaking or escaping during fusing.

With reference now to Figure 5, which illustrates a modified method of practicing my invention, A' is a tubular section which is counterbored substantially as previously described in connection with the section A and thereby provided with an annular shoulder I'. Thereupon, a steel inner liner or shell C' provided at its outer margin with a circumferential flange or extension 3 is disposed within the section A'. The flange 3 has an external diametral size substantially the same as the internal diametral size of the counterbored portion of the section A', and thus the liner C forms with and within the section A' a substantially enclosed annular space or chamber, as at 4. The section A' is provided in its wall with a radially disposed aperture 5 for snugly accommodating a steel or other suitable tube 6 supplied or charged plentifully with copper wire, copper filings, or the like.

The inner liner C may, if required, be welded securely in place, and the assembly comprising the section A', liner C', and charged spout or tube 6 placed in a furnace in which a reducing atmosphere and a relatively high temperature is maintained, care being observed to maintain the tube 6 in substantially vertical position. Hence, the copper charge, on fusing, runs down into, and completely fills, the space or chamber 4, as shown in Figure 5.

Upon removal from the furnace, the section A' is allowed to cool and the inner liner C machined out, as above described. At the same time, the tube 6 may also be machined off, leaving a residual radial neck or riser of copper, which does not materially weaken the finished fitting.

Thus, by my invention, I am enabled to economically and with ease and facility provide a type of pipe connection or fitting which may be utilized in the formation of joints equally well in either soft or hard soldering and with copper, steel, or bronze tubing. In fact, fittings constructed in accordance with my invention lend themselves readily to the formation of welded joints, since the copper coating or layer lining may be beveled inwardly instead of outwardly with the use of a simple burr-removing rose reamer of the type commonly used by pipe fitters, electricians, and plumbers. Obviously, fittings constructed in accordance with my invention will not be materially weakened by the high temperature employed in hard soldering or welding and will form, under all conditions, a joint possessing very high structural strength.

A steel re-enforced joint of the type contemplated by my invention is not subject to severe annealing at hard soldering temperatures as are straight copper joints, and I may add that pipe-joint fittings of my invention have been found to be exceedingly efficient in the performance of their intended functions.

It should be understood that changes and modifications in the form, construction, arrangement, and combination of the parts of the pipe-joint fitting and in the several steps of its production may be made and substituted for those herein shown and described without departing from the nature and principle of my invention.

Having thus described my invention, what I claim and desire to secure by Letters Patent is:

1. The method of forming a metallic pipe-joint fitting which comprises cylindrically counterboring the fitting-section from its open end inwardly for a portion of its length, inserting thereinto a fusible thimble sized for substantially replacing the metal removed by said counterboring, interlining the thimble with a relatively non-fusible insert member for holding the material of the thimble in place when molten, fusing the thimble into the section, and subsequently removing the insert member.

2. The method of forming a pipe-joint fitting which comprises cylindrically counterboring the fitting-section for a portion of its length, inserting thereinto a solid cylindrical copper thimble, interlining the thimble with a steel shell for holding the material of the thimble in place when molten, fusing the thimble into the section, and subsequently removing the shell.

3. The method of forming a pipe-joint fitting which comprises counterboring the fitting-section for a portion of its length, inserting thereinto a fusible thimble, interlining the thimble with a relatively non-fusible shell for holding the material of the thimble on fusing in place, fusing the thimble into the fitting-section, and removing the shell for a portion of its length and thereby providing the fitting-section with a shoulder for pipe-abutment.

4. The method of forming a pipe-joint fitting which comprises counterboring the fitting-section for a portion of its length, inserting thereinto a fusible thimble, interlining the thimble with a relatively non-fusible shell for holding the material of the thimble on fusing in place, welding the shell to the fitting-section, heating the entire assembly for fusing the thimble into the fitting, and subsequently removing the shell.

5. The method of forming a unitary metallic pipe-fitting having a pipe-receiving nipple which comprises confining a solid metallic copper shell in snug-fitting engagement upon the inner face of the pipe-receiving nipple in such a manner that the copper will not flow when melted, and fusing the copper shell into the pipe-receiving nipple so as to present a substantially pure copper coating bonded to the fitting by an intermediate zone in which the copper has been alloyed with the material of the pipe-fitting.

6. The method of forming a unitary metallic pipe-fitting having a pipe-receiving nipple which comprises confining a solid metallic copper shell in snug-fitting engagement upon the inner face of the pipe-receiving nipple in such a manner that the copper will not flow when melted, and fusing the copper shell into the nipple in a non-oxidizing atmosphere and at such temperature as to cause the copper to alloy with the material of the nipple in the region of the interface therebetween.

7. The method of forming a steel pipe-joint fitting which comprises inserting into the pipe-receiving section a steel sleeve of smaller diameter than that of the fitting and having at each end annular flanges for engaging the fitting in the formation of an annular recess, boring the fitting to provide access to the recess, placing a fusible material within the bore, heating the fitting to cause the fusible material to run into the recess and line the fitting, and subsequently boring out the steel sleeve to leave the fused lining exposed.

PARKE H. THOMPSON.